Dec. 29, 1931.  L. H. MORRILL  1,838,436
INTERNAL COMBUSTION ENGINE
Filed Dec. 20, 1929
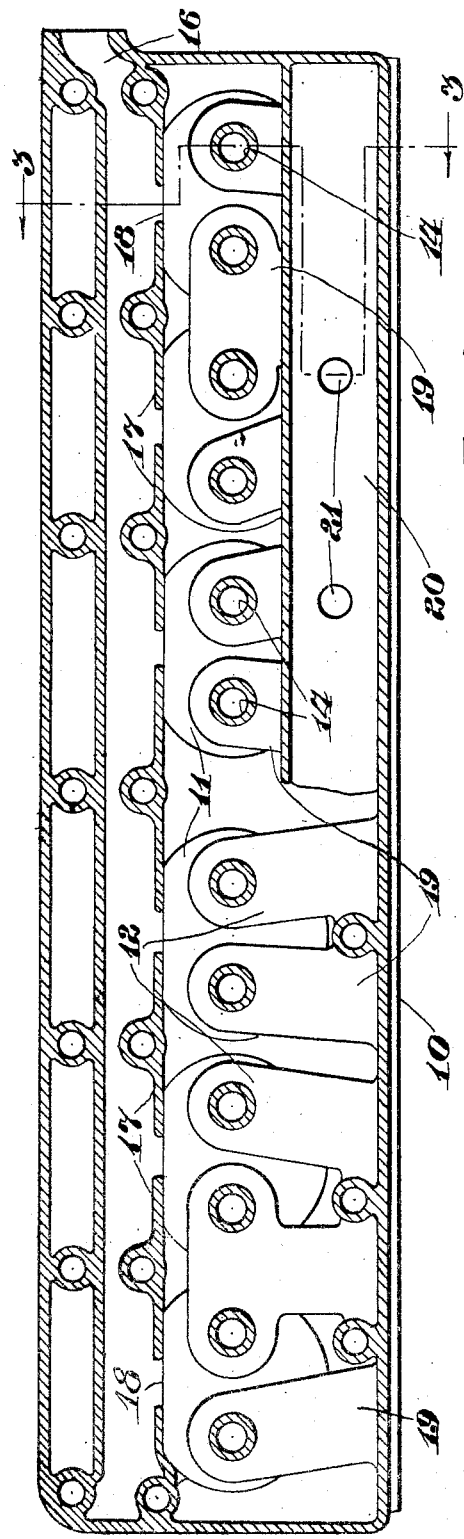
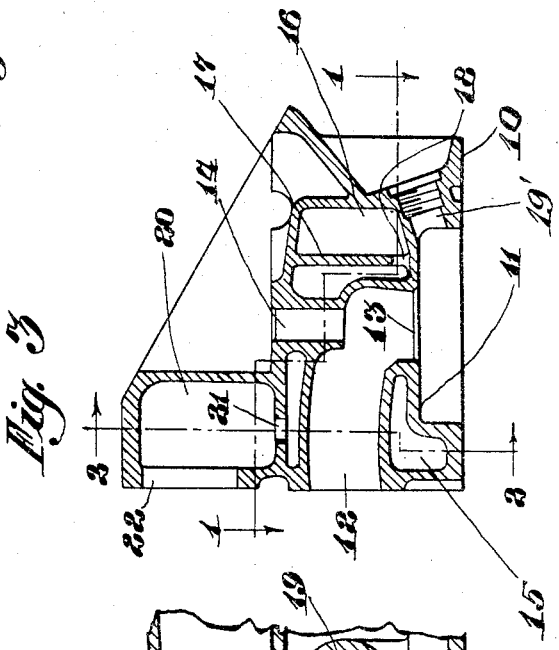
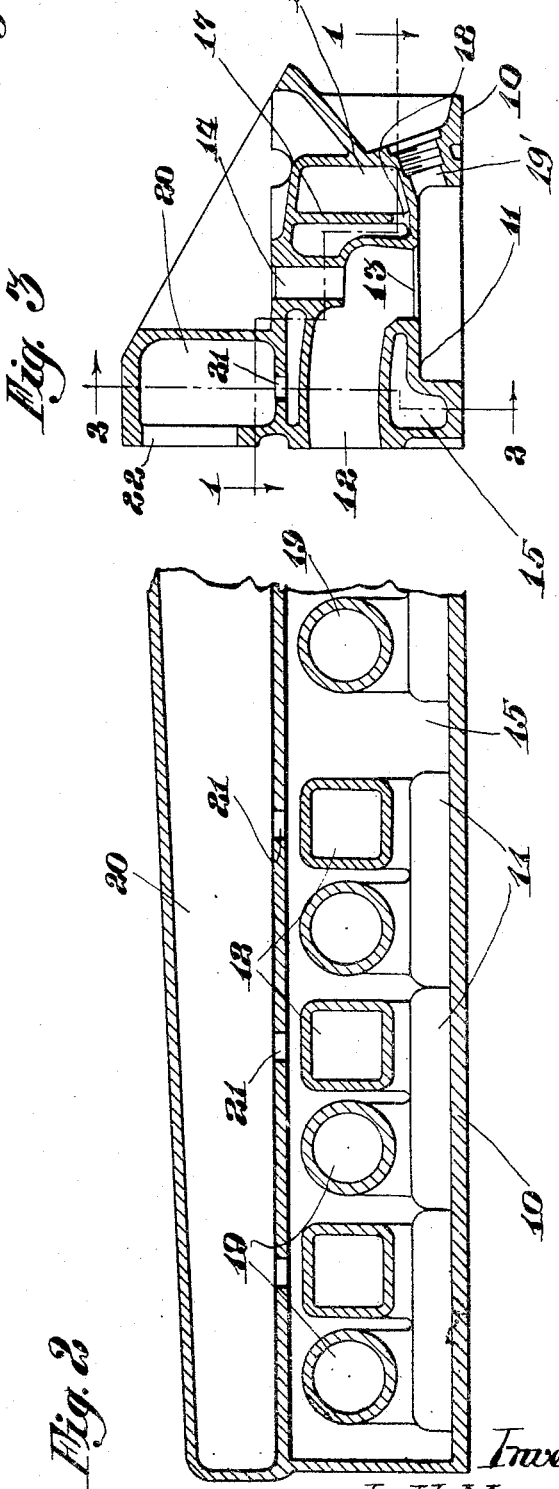
Inventor
L. H. Morrill
By W. P. Sarleat
Atty.

Patented Dec. 29, 1931

1,838,436

UNITED STATES PATENT OFFICE

LEWIS H. MORRILL, OF FORT WAYNE, INDIANA, ASSIGNOR TO INTERNATIONAL HARVESTER COMPANY, A CORPORATION OF NEW JERSEY

INTERNAL COMBUSTION ENGINE

Application filed December 20, 1929. Serial No. 415,391.

This invention relates to internal combustion engines.

More particularly the invention relates to a cooling system for the head or cover of such an engine. In these engines, it is customary to provide cooling spaces or a jacket around the cylinder block of the engine and also to provide such jackets or spaces in the head, the two being in communication, and a cooling medium, such as water, being circulated through the said jackets in any appropriate manner, to transfer the heat from the engine and dissipate the same in an exterior device, such as a radiator.

In the present construction a separate cooling or circulating system is provided for the head, which is entirely independent of the liquid circulating system in the cylinder block.

The objects of the invention are to provide a novel head construction for an internal combustion engine, so designed that the water or other cooling liquid circulated therethrough will best function to transfer the heat from the cylinder head and valves and especially the exhaust valves; to provide such a system in which the water is circulated through an inlet manifold by means of a pump or some other impelling mechanism; to provide an exhaust manifold which will return the heat laden liquid to the radiator; to provide a partition wall delineating one face of the inlet manifold and having circulating openings therein to cause that water effectively to wash the walls surrounding the valves, as well as to flush the cylinder head; and, lastly, generally to improve the construction and enhance the operation of an internal combustion engine.

Briefly, these very desirable objects are achieved in a liquid cooled head for an internal combustion engine, which head preferably comprises an integral casting having water circulating spaces therein over the cylinder walls, around the exhaust and inlet leads, and around the valve guides, there being an inlet manifold having circulating means for causing the liquid to wash and dissipate heat from the hottest regions in the head, said inlet manifold receiving the cooling liquid under pressure from the pump, there further being an outlet manifold which returns the water to the radiator.

An illustrative embodiment of the invention is shown in the accompanying sheet of drawings, in which:

Figure 1 is a sectional view through horizontal planes of the head as viewed along the section line 1—1 appearing in Figure 3;

Figure 2 is a fragmentary view of the head showing a vertical section, as seen along the line 2—2, looking in the direction of the arrows appearing in Figure 3; and, Figure 3 is a vertical, transverse, sectional view as appears along the broken section line 3—3 in Figure 1, when looking in the direction of the arrows.

The improved head or cover is generally indicated at 10, the same having walls 11 delineating the cylinder walls. Exhaust leads 12 in the form of pipes lead to the cylinder spaces through valve seats 13, there being valve guides 14 vertically above the seats 13. A water circulating space 15 surrounds these members to cause the cooling liquid to wash all of these members.

An inlet water manifold 16 is arranged longitudinally along one side of the head, the inner side of said manifold being delineated by a partition wall 17, which is vertically arranged and has formed therethrough along its bottom at spaced intervals water circulating openings 18 for distributing the water into the spaces 15 around the valve seats 13, over the cylinder head walls 11, and around the pipes 12, as well as around the valve guides 14. Inlet valve leads 19 are also cast integrally in the head, these also leading to the cylinders, as shown best in Figures 1 and 2. The right hand end of the water manifold 16, as viewed in Figure 1, is in communication with the water circulating pump of the engine, so that the liquid entering the same is under pressure. As the water is under pressure, it naturally goes through the openings 18 in the partition 17 with considerable velocity, thus creating a thorough washing action across the cylinder wall heads 11 and around the exhaust valves, quickly to transfer the heat therefrom and prevent the formation of steam bubbles or pockets. Spark plug bores are shown at 19', and it will be seen that these too are exposed to the cooling liquid.

An outlet manifold for cooling medium is also provided and this is shown as comprising an integrally cast and longitudinally disposed conduit 20, said manifold arranged higher than the inlet manifold 16 and offset therefrom to locate above the cooling space surrounding the inlet and exhaust pipes 19 and 12. The floor of the outlet manifold has formed therein at suitably spaced intervals a plurality of openings 21 located over each exhaust port 12, thus causing the cooling liquid to be circulated into the outlet manifold, taking off heat from the exhaust ports, after it has passed through the spaces 15. The outlet manifold has an exhaust opening 22, which returns the water to the radiator for the engine.

It is to be understood that the liquid circulating system for the head of the internal combustion engine of this invention is entirely separate from an independent of any part of the cooling system or water jacketing for the cylinder block, thus providing a separate head cooling system which is more efficient as the heat of the head is rapidly dissipated and the separate cooling system for the block can be maintained at an even temperature, which is highly desirable.

In operation, then, a cooling liquid, such as water, comes from the pump under pressure and goes into the open end of the inlet manifold 16. The wall or partition 17 in a sense isolates the water from the hot regions of the engine head and thus serves as a reservoir for a comparatively cooler fluid than that, for example, circulated in the spaces 15. As this water is under pressure, it goes through the openings 18 with a considerable velocity, thus effectively washing the compression chamber walls 11 and the walls around the exhaust valves and the guides 14, as well as the pipes 12 and 19. This washing action around the exhaust valves prevents the formation of objectionable steam pockets or bubbles. Further, this rapid circulation and washing action quickly transfers the heat from these hot regions in the head. Thence, the water, being heated, and pump impelled, rises upwardly through the openings 21 and into the outlet manifold 20, and finally out through the opening 22 and back to the radiator.

From this detailed description it must now be obvious that an improved and very efficient cooling system for the heads of internal combustion engines has been provided, which achieves all of the desirable objects heretofore recited.

It is the intention to cover all such alterations and modifications of the example herein shown as do not materially depart from the spirit and scope of the invention as indicated in the appended claims.

What is claimed is:

1. A liquid cooled head having valve leads, valve guides, cylinder head walls, and spark plug bores for an internal combustion engine, said head comprising a water inlet manifold running longitudinally over the spark plug bores along one side of the head, a vertical partition delineating one side of the said water manifold and having liquid distributing openings therein at spaced intervals for circulating the liquid around the valve leads, valve guides, and the cylinder head walls, a water outlet manifold running longitudinally of the head above the valve leads, said water outlet manifold having a floor provided with openings at spaced intervals to provide communication with cooling spaces around the valve leads, valve guides, and cylinder head walls.

2. A liquid cooled head having valve leads, valve guides and cylinder head walls for an internal combustion engine, said head comprising an integrally formed cover including a water inlet manifold running longitudinally along the head, a vertical partition delineating one side of the said water manifold and having liquid distributing openings therein at spaced intervals adjacent the floor of said manifold for circulating the liquid around the valve leads, valve guides, and the cylinder head walls, a water outlet manifold running longitudinally of the head above the valve conduits, said water outlet manifold having a floor provided with openings at spaced intervals to provide communication with cooling spaces around the valve leads, valve guides, and cylinder head walls.

3. A liquid cooled head for an internal combustion engine, said head comprising a cover having water circulating spaces formed therein around the valve leads, the valves, and the cylinder of the engine, said spaces being independent of the cylinder block, an inlet water manifold receiving liquid from an engine pump, a wall for the inlet water manifold having distributing openings for circulating the liquid to the spaces aforementioned, and an outlet water manifold having openings to receive the liquid from said spaces and to return it to a radiator for the engine.

4. A liquid cooled head for an internal combustion engine, said head comprising an integrally formed cover having water circulating spaces formed therein around the valve leads, the valves and the cylinder of the engine, said spaces being independent of the cylinder block, an inlet water manifold included in the cover for receiving liquid from an engine pump, a vertically disposed distributing wall for the inlet water manifold having spaced distributing openings along its lower edge for circulating liquid to the spaces aforementioned, and an outlet water manifold also included in the cover and having openings to receive the liquid from said spaces and to return it to a radiator for the engine.

5. A liquid cooled head having intake and exhaust valve leads, valve guides and cylinder head walls for an internal combustion engine, said head including a water inlet manifold running longitudinally thereof, a partition delineating one side of said water inlet manifold, said partition having openings arranged to cause distribution of the water with a washing action across the top of each cylinder head and around the valve leads and guides, and a water outlet manifold running longitudinally of the head over the valve leads, said outlet water manifold having a floor provided with openings that connect the outlet water manifold with the head cooling spaces.

6. A liquid cooled head having intake and exhaust valve leads, valve guides and cylinder head walls for an internal combustion engine, said head including a water inlet manifold running longitudinally thereof, a partition delineating one side of said water inlet manifold, said partition having openings arranged to cause distribution of the water with a washing action across the top of each cylinder head and around the valve leads and guides, and a water outlet manifold running longitudinally of the head over the valve leads, said outlet water manifold having a floor provided with openings located one each above each exhaust valve lead, said openings connecting the outlet water manifold with the head cooling spaces.

In testimony whereof I affix my signature.

LEWIS H. MORRILL.